United States Patent
Quach et al.

(10) Patent No.: US 7,895,472 B2
(45) Date of Patent: Feb. 22, 2011

(54) SYSTEM AND METHOD OF MANAGING BIOS TEST ROUTNES

(75) Inventors: Natalie N. Quach, Austin, TX (US); Mark W. Shutt, Austin, TX (US); Peter Cloney, Round Rock, TX (US); Robert J. Volentine, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 352 days.

(21) Appl. No.: 12/124,331

(22) Filed: May 21, 2008

(65) Prior Publication Data

US 2009/0292949 A1  Nov. 26, 2009

(51) Int. Cl.
*G06F 11/00* (2006.01)
(52) U.S. Cl. .......................... 714/27; 714/36
(58) Field of Classification Search .................. 714/27, 714/25, 33, 36; 713/1, 3, 2
See application file for complete search history.

(56) References Cited

U.S. PATENT DOCUMENTS

| | | | |
|---|---|---|---|
| 6,324,644 B1 * | 11/2001 | Rakavy et al. | 713/1 |
| 2006/0129744 A1 * | 6/2006 | Rothman et al. | 711/100 |
| 2008/0066087 A1 * | 3/2008 | Franklin | 719/325 |

* cited by examiner

*Primary Examiner*—Dieu-Minh Le
(74) *Attorney, Agent, or Firm*—Larson Newman & Abel, LLP

(57) ABSTRACT

A system and method of a basic input output system (BIOS) test system are disclosed. According to an aspect, a basic input output system (BIOS) test system can include a BIOS test manager configured to enable BIOS testing of multiple information handling systems within a test environment. The BIOS test system can also include a local test harness driver operable to be coupled to the remote BIOS test manager to receive test routines, and a test buffer configured to receive a test routine from the BIOS test manager. The test routine can further be executed using a test engine integrated as a part of a BIOS of a particular information handling system.

20 Claims, 5 Drawing Sheets

SYSTEM AND METHOD OF MANAGING BIOS TEST ROUTNES

FIELD OF THE DISCLOSURE

This disclosure relates generally to information handling systems, and more particularly, to a system and method of managing basic input output system (BIOS) test routines.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
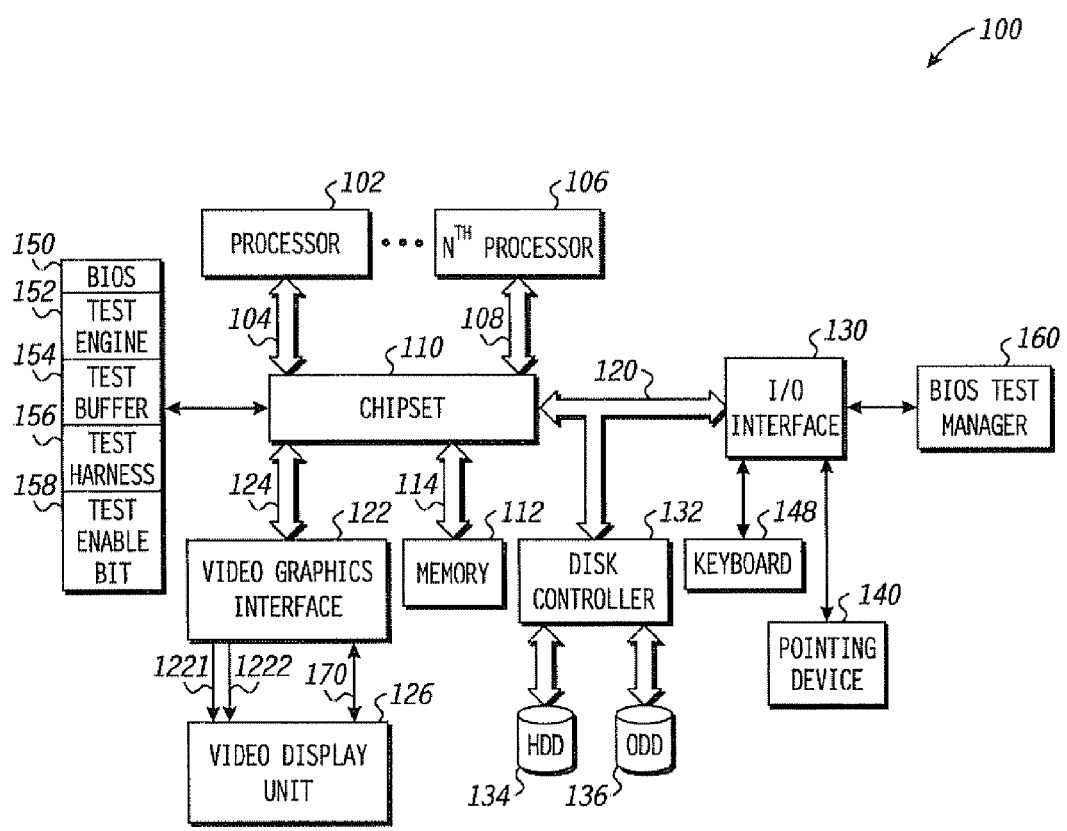
FIG. 1 illustrates a block diagram of an information handling system according to an aspect of the disclosure.

The following description in combination with the figures is provided to assist in understanding the teachings disclosed herein. The following discussion will focuses on specific implementations and embodiments. This focus is provided to assist in describing the teachings and should not be interpreted as a limitation on the scope or applicability of the teachings. However, other teachings can certainly be used in this application. The teachings can also be used in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Portions of an information handling system, when referred to as a "device," a "module," or the like, can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices or programs that are in communication with one another need not be in continuous communication with each other unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. In this context, a communicative interaction may be intending to send information, sending information, requesting information, receiving information, receiving a request for information, or any combination thereof. As such, a communicative interaction could be unidirectional, bidirectional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. The communicative interaction between the network elements is not necessarily limited to only one specific form. A network element may be a node, a piece of hardware, software, firmware, middleware, another component of a computing system, or any combination thereof.

In the description below, a flow charted technique may be described in a series of sequential actions. Unless expressly stated to the contrary, the sequence of the actions and the party performing the actions may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

An information handling system and method of using it are described below. An exemplary, non-limiting system description is described before addressing methods of using it. Some of the functionality of modules within the system is described with the system. The utility of the system and its modules will become more apparent with the description of the methods that follow the description of the system and modules.

According to an aspect, a basic input output system (BIOS) test system can include a BIOS test manager configured to enable BIOS testing of multiple information handling systems within a test environment. The BIOS test system can also include a local test harness driver operable to be coupled to the remote BIOS test manager to receive test routines, and a test buffer configured to receive a test routine from the BIOS test manager. The test routine can further be executed using a test engine integrated as a part of a BIOS of a particular information handling system.

According to another aspect, a method of testing a BIOS is disclosed. The method can include detecting a test routine using a local test harness driver. The test routine can be communicated over a network from a BIOS test manager employing a remote test harness driver. The method can also include transferring the test routine to a test buffer accessible to an information handling system to be tested. The method can further include enabling execution of the test routine at the information handling system using a BIOS test engine configured to be executed during BIOS testing of the information handling system.

According to a further aspect, an information handling system is disclosed. The information handling system can include a BIOS configured to be tested using a test routine communicated by a remote BIOS test manager. The information handling system can also include a BIOS test harness configured to execute a test engine using the BIOS to test the BIOS. The information handling system can further include a map file accessible to the BIOS test harness during testing of the test routine communicated by the remote BIOS test manager.

FIG. 1 illustrates a block diagram of an exemplary embodiment of an information handling system 100. The information handling system 100 can be a computer system such as a server, a desktop computer, a laptop computer, a rack of computers (e.g., networked servers), the like, or any combination thereof. After reading this specification, skilled artisans will appreciate that the information handling system can be configured to their particular needs or desires.

As illustrated in FIG. 1, the information handling system 100 can include a processor 102 connected to a host bus 104 and can further include additional processors generally designated as $N^{th}$ processor 106 connected to a host bus 108. The processors 102 and 106 can be separate physical processors, and in another embodiment, the processors 102 and 106 can be different cores within the same integrated circuit. The processor 102 can be connected to a chipset 110 via the host bus 104. Further, the processor 106 can be connected to the chipset 110 via the host bus 108. The chipset 110 can support multiple processors and can allow for simultaneous processing of multiple processors and support the exchange of information within information handling system 100 during multiple processing operations.

In an embodiment, the chipset 110 can be referred to as a memory hub or a memory controller. For example, the chipset 110 can include an Accelerated Hub Architecture (AHA) that uses a dedicated bus to transfer data between the processors 102 and 106. For example, the chipset 110 including an AHA-enabled chipset can include a memory controller hub and an input/output (I/O) controller hub. As a memory controller hub, the chipset 110 can function to provide access to the processor 102 using the host bus 104 and the processor 106 using the host bus 108. The chipset 110 can also provide a memory interface for accessing memory 112 using a host bus 114. In a particular embodiment, the host buses 104, 108, and 114 can be individual buses or part of the same bus. The chipset 110 can also provide bus control and handle transfers between the host buses 104, 108, and 114.

According to another aspect, the chipset 110 can be generally considered an application specific chipset that provides connectivity to various buses, and integrates other system functions. For example, the chipset 110 can be provided using an Intel®-brand Hub Architecture (IHA) chipset also that can include two parts, a Graphics and Accelerated Graphics Port (AGP) Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 110. The chipset 110 can also be packaged as an application specific integrated circuit (ASIC).

The information handling system 100 can also include a video/graphic interface module 122 that can be connected to the chipset 110 using host bus 124. The video/graphic module 122 includes two or more video/graphic ports, such as video/graphics port 1221 and video/graphic port 1222, capable of providing image information substantially simultaneously to a common video/graphics display device 126 for substantially simultaneous display as described in greater detail herein. Also, each of the video/graphic ports 1221 and 1222 are capable of providing image information to separate video/graphic devices for substantially simultaneous display. The video/graphic display device 126 is also referred to herein as a display unit 126.

The display unit 126 can include one or more types of video/graphic display devices, such as a flat panel display (FPD) or other type of display device. In accordance with the present disclosure, the video/graphic interface module 122 can detect the presence of a cable adapter 170 and configure multiple video/graphic ports, such as DisplayPort video/graphic ports, to operate in tandem along with the cable adapter to implement a Dual-Link DVI video/graphic port.

The information handling system 100 can also include an I/O interface module 130 that can be connected via an I/O bus 120 to the chipset 110. The I/O bus 120 and the I/O interface 130 can include industry standard buses or proprietary buses and respective interfaces or controllers. In one form, a PCI bus can be operated at approximately 66 MHz and a PCI-Express bus can be operated at more than one (1) speed (e.g. 2.5 GHz and 5 GHz). PCI buses and PCI-Express buses can comply with industry standards for connecting and communicating between various PCI-enabled hardware devices. Other buses can also be used in association with, or independent of, the I/O bus 120 including, but not limited to, industry standard buses or proprietary buses, such as Industry Standard Architecture (ISA), Small Computer Serial Interface (SCSI), Inter-Integrated Circuit (I²C), System Packet Interface (SPI), or Universal Serial buses (USBs).

In an alternate embodiment, the chipset 110 can be a chipset employing a Northbridge/Southbridge chipset configuration (not separately illustrated). For example, a Northbridge portion of the chipset 110 can communicate with the processor 102 and can control interaction with the memory 112, interaction with bus 120, which can be a PCI bus, and interactions with bus 124 which can be a PCI bus or an AGP bus. The Northbridge portion can also communicate with the processor 102 using host bus 104 and with the processor 106 using the host bus 108. The chipset 110 can also include a Southbridge portion that can handle I/O functions of the chipset 110. The Southbridge portion can manage the basic forms of I/O such as USB, serial I/O, audio outputs, Integrated Drive Electronics (IDE), and ISA I/O for the information handling system 100.

The information handling system 100 can further include a disk controller 132 connected to the bus 120. The disk controller 132 can be used to connect one or more disk drives such as a hard disk drive (HDD) 134 and an optical disk drive (ODD) 136 such as a Read/Write Compact Disk (R/W-CD), a Read/Write Digital Video Disk (R/W-DVD), a Read/Write mini Digital Video Disk (R/W mini-DVD), or other type of optical disk drive.

In a particular form, the information handling system 100 includes a BIOS 150. The BIOS 150 can include a test engine 152, a test buffer 154, a test harness 156, and a test enable bit 158. The BIOS 150 can be used to test one or more components of the information handling system 100. For example, during a power on self-test routine, the test enable bit 158 can be accessed to determine whether to enable testing of the BIOS 150 and components of the information handling system 100. If the test enable bit 158 is set, the test engine 152 and the test harness 156 can be enabled. Testing of the BIOS 150 and components of the information handling system 100 can then be performed.

According to another aspect, the BIOS test manager 160 can be coupled to the I/O interface 130 using a network communication device (e.g. LAN card, WAN card, 802.11 g card, etc.). The BIOS test manager 160 can communicate a plurality of test routines to be used by the test harness 156 based on a configuration of the information handling system 100. The configuration can include a listing of each of the components of the information handling system 100 that can be tested by the test harness 156. In a particular form, the BIOS test manager 160 can identify each of the components and associated test routines. The test routines can be maintained within a test routine repository or database accessible by the BIOS test manager 160 and accessed and communicated to the information handling system 100.

Figure 2:
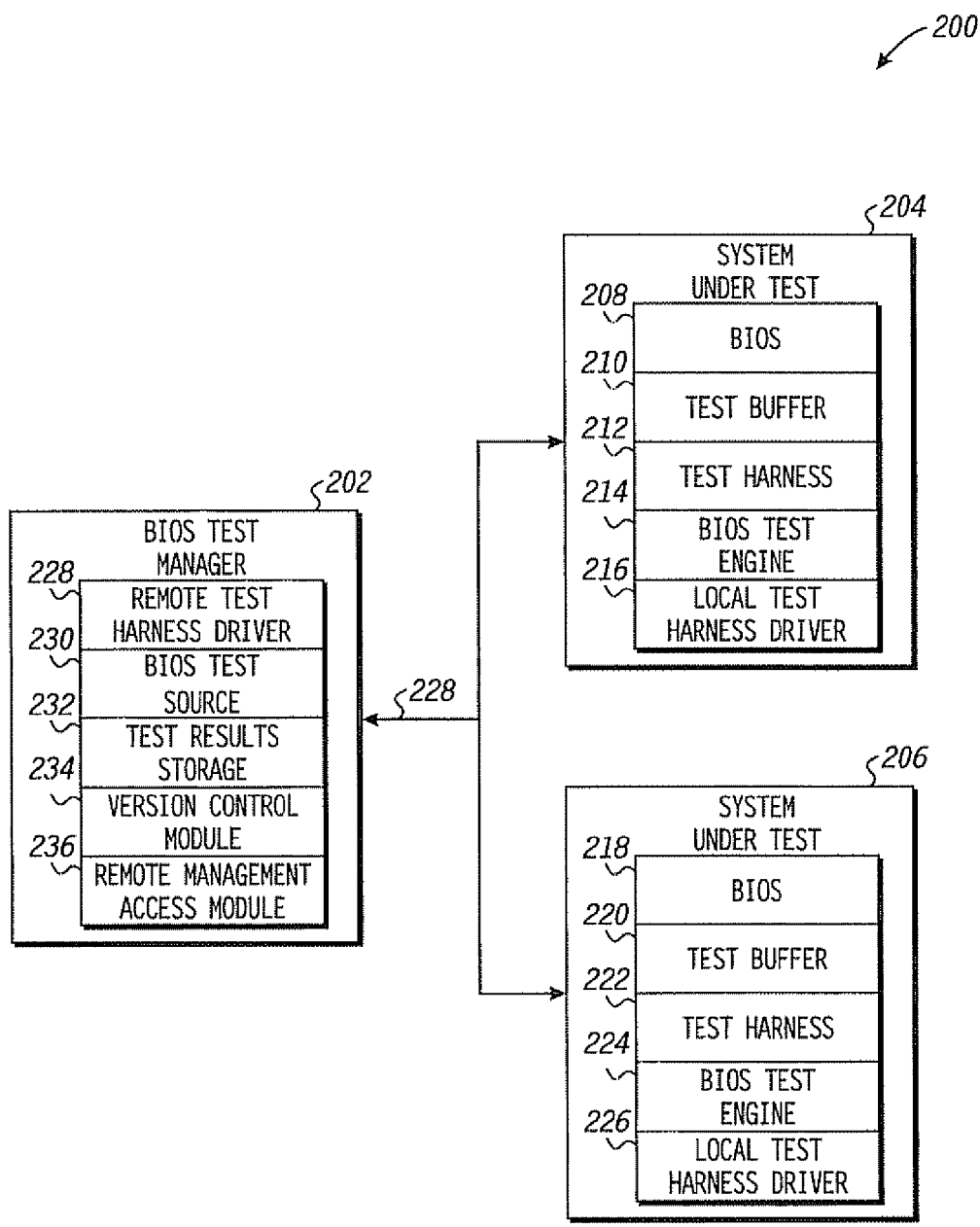
FIG. 2 illustrates a functional block diagram of a BIOS test system according to an aspect of the disclosure.

FIG. 2 illustrates a BIOS test system 200, according to an aspect of the disclosure. The BIOS test system 200 includes a BIOS test manager 202 operable to be coupled to one or more information handling systems that can be tested. For example, the BIOS test manager 202 can be coupled to a system under test 204 and a system under test 206. Additional systems under test can be added or removed as desired. A system under test 204, 206 can tested prior to shipping to a customer. However, according to an aspect, the BIOS test manager 202 can be used to test an information handling system at a customer site using a network connection.

According to a further aspect, the system under test 204 can include a BIOS 208, a test buffer 210, a local test harness 212, a BIOS test engine 214, and a local test harness driver 216. The test buffer 210 can be coupled the BIOS test manager 202 and can receive BIOS test routines and store test results to be communicated to the BIOS test manager 202 via a network 228.

Similarly, the system under test 206 can include a BIOS 218, a test buffer 220, a local test harness 222, a BIOS test engine 224, and a local test harness driver 226. The test buffer 220 can be coupled the BIOS test manager 202 and can receive BIOS test routines and store test results to be communicated to the BIOS test manager 202 via a network 228.

According to a further aspect, each local test harness driver 216, 226 can be used to control the flow of BIOS testing. For example, test routines can be loaded into the test buffers 210, 220 When a test routine and results may be completed, and the local test harness drivers 216, 226 can load another test routine into the test buffers 210, 220. In other forms, the BIOS test manager can communicate test routines, map information, BIOS table data, etc. to the local test harness drivers 216, 226 to be loaded into the test buffers 210, 220.

According to one aspect, each test harness 212, 222 can be configured with the BIOS test engines 214, 224 to test each BIOS 208, 218. Each test harness and BIOS test engine can be configured as integral part of the BIOS, and allows calling BIOS procedures and testing of an entire BIOS stack. For example, each BIOS test engine 214, 224 can be integrated as a part of the BIOS that calls into the actual BIOS code, and passes internal parameters and checks the status of the test.

According to an aspect of the disclosure, the BIOS test manager 202 can include a remote test harness diver 228, a BIOS test source 230, and a test results storage 232 such as a database, log file, etc. configured to store test results, status information, and the like. The BIOS test manager 202 can further include a version control module 234 configured to manage storage of various test routines. The BIOS test manager 202 can further include a remote management access module 236 configured to enable access to the BIOS test manager 202. The BIOS test manager 202 can be deployed using one or more servers located remote to each system under test 204, 206. Additionally, each system under test 204, 206 can be located at the same manufacturing site, or in other forms can be located at separate manufacturing sites. As such, multiple network locations can be used to test an information handling system. In other forms, a test cell within a manufacturing facility can include one or more network locations. Additionally, an information handling system can also be tested within development environment, within a manufacturing environment, a test environment, or any combination thereof. Management of test routines to test various components of an information handling system can be maintained at a single location and accessed remotely as needed or desired.

In a particular aspect, each test harness 212, 222 can function to initiate executing BIOS Test Routines (TR's) on each system under test 204, 206. According to one aspect, the BIOS TR's can be written and compiled outside of each system under test 204, 206 and BIOS 208, 218 using map file information of each specific BIOS. According to an aspect, a TR can directly call available procedures in the BIOS, and the TR can substitute routines in the BIOS with specific routines that can be a part of the TR. As such, the TR can simulate hardware, input parameters to a BIOS procedure, an can access the BIOS firmware memory stack.

According to a particular aspect, system under test 204, 206 can include debug registers accessible by each test harness 212, 222 to allow trapping selected I/O and memory accesses. For example, subroutines that are a part of a TR are invoked when the I/O or memory trap occurs. These invoked TR's can simulate the hardware including system memory. The hardware simulation can be instrumental when actual hardware of an IHS may not be available during BIOS testing.

Figure 3:
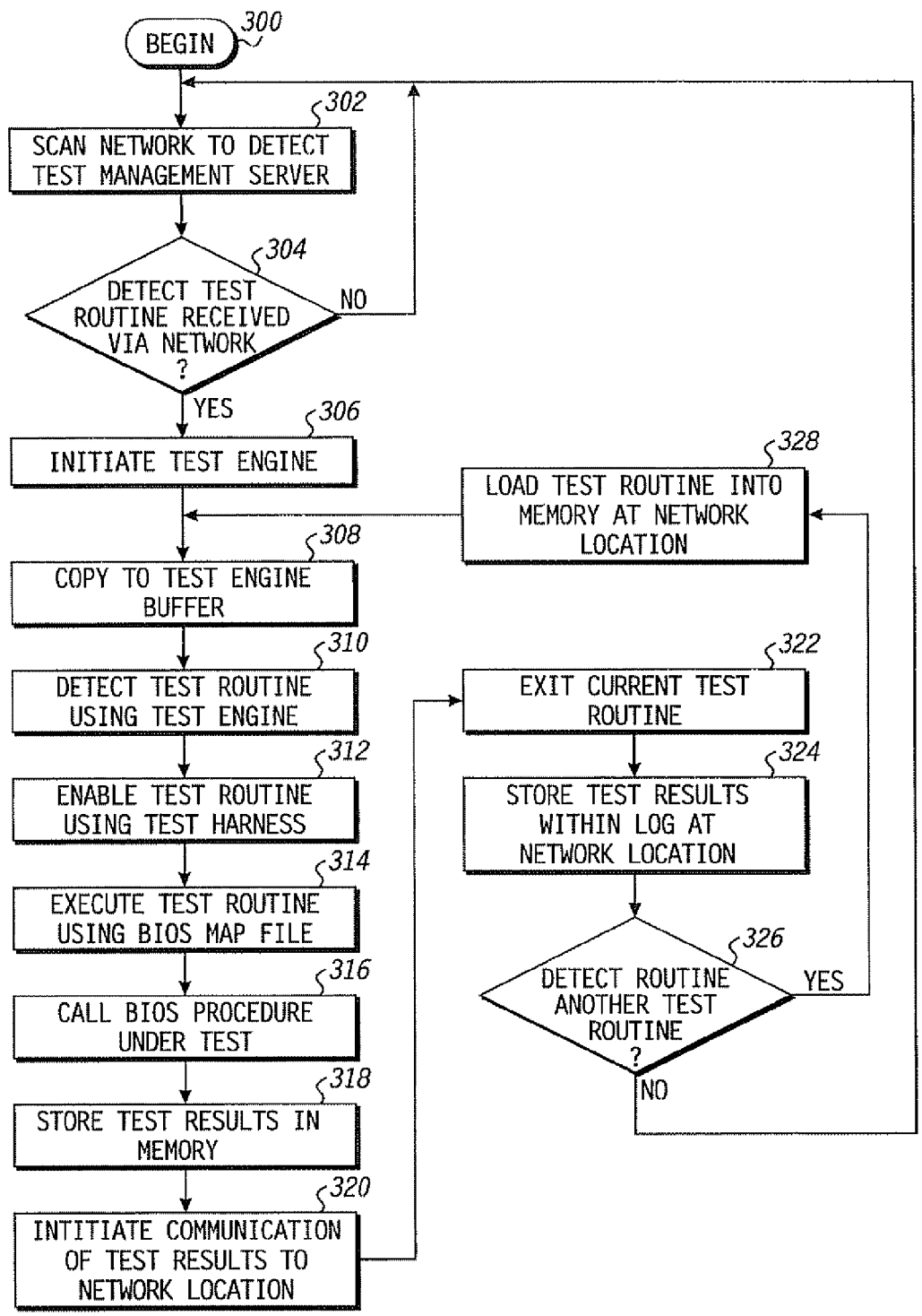
FIG. 3 illustrates a flow diagram describing a method of testing a BIOS using a BIOS test system according to another aspect of the disclosure.

FIG. 3 illustrates a flow diagram describing a method of testing a BIOS using a BIOS test system according an aspect of the disclosure. FIG. 3 can be employed in whole, or in part, by the information handling system 100 depicted in FIG. 1, the BIOS test system 200 of FIG. 2, or any other type of system, controller, device, module, processor, or any combination thereof, operable to employ all, or portions of, the method of FIG. 3. Additionally, the method can be embodied in various types of encoded logic including software, firmware, hardware, or other forms of digital storage mediums, computer readable mediums, or logic, or any combination thereof, operable to provide all, or portions of, the method of FIG. 3.

The method begins generally at block 300. At block 302, the method scans or reads the network buffer to detect if a test routine has been received. The method can then proceed to decision block 304, and detects if a test routine has been received via a network. For example, a remote BIOS management system can communicate a test routine to a test cell that can be detected at decision block 304. If a test routine has not been received, the method can then proceed to block 302 and repeats.

If at decision block 304, a test routine has been received, the method initiates a test engine (TE) using the system BIOS. For example, the TE can be initiated towards the end of the BIOS POST of the system being tested. Upon initiating the TE, the method can proceed to block 308 and the test routine can be copied to the test engines buffer. The method can then proceed to block 310 and detects when the test routine is received at the test engine's buffer. For example, an information handling system can be coupled to a network and can copy a test routine received from the BIOS management system to the TE's buffer. In one form, the test routine can be copied using a parallel network interface of the information handling system. However in other forms the test routine can be copied using a parallel network interface, wireless network interface, serial network interface or any combination thereof.

Upon detecting a test routine has been received, the method can proceed to block 312 and the BIOS TE can enabled the TR. For example, the TR can be previously compiled using the BIOS map file data of the information handling system being tested. As such, the TR can be enabled using the test harness TE execution buffer.

Upon enabling the TR, the method can proceed to block 314 and executes the test routine. For example, the TR can call BIOS procedures or access BIOS data structures using addresses listed in the BIOS map files. For example, the TR can call a BIOS procedure under test, and initiate substituting a routine for another routine to be called by a target procedure. The target procedure can be the main BIOS procedure called by the TR. As such, a 'Routine Substitution' can be used to allow the TR to simulate inputs to the BIOS routines being tested. The specifications of the substitute routine can be accomplished using a substitution table.

In a particular form, the TR can use an "MEMIO substitution". For example, an MEMIO substitution can include the TR specifying a particular routine be called when one or more BIOS procedures under test executes an I/O instruction or accesses memory at a given address. Using the MEMIO substitution, the TH TE can make use of a table residing in the TR program code. For example, logic in the TH TE decodes the Substitution or MEMIO tables and can sets up the interrupt traps to re-direct the procedure call or memory or I/O access to the desired substitute routine.

Upon executing the TR, the method can proceed to block 318, and test results can be stored within a memory or buffer of the test harness TE. The TH TE can detect the results such as a pass/fail result, and other test result information. Upon detecting the results, the method can proceed to block 320 and the test results, test progress/status, or other information can be communicated back to via the network to a TH communication driver executing on the remote side of the network. Upon communicating the results, the method can proceed to block 322 and exits the TR, and to block 324 where the current TR program results can be stored within a log file or other type of file at the remote location.

The method can then proceed to decision block 326 and detects whether a another test routine is available. For example, remote network location can include a server executing a TH remote side driver program. The TH remote side driver program can detect another test routine. Upon detecting another test routine, the method can proceed to block 328 and the next TR routine can be loaded into memory on the remote server, and send the TR over the network to the TH TE executing in the BIOS of the computer system under test at block 308. The method can then proceed as described above.

Figure 4:
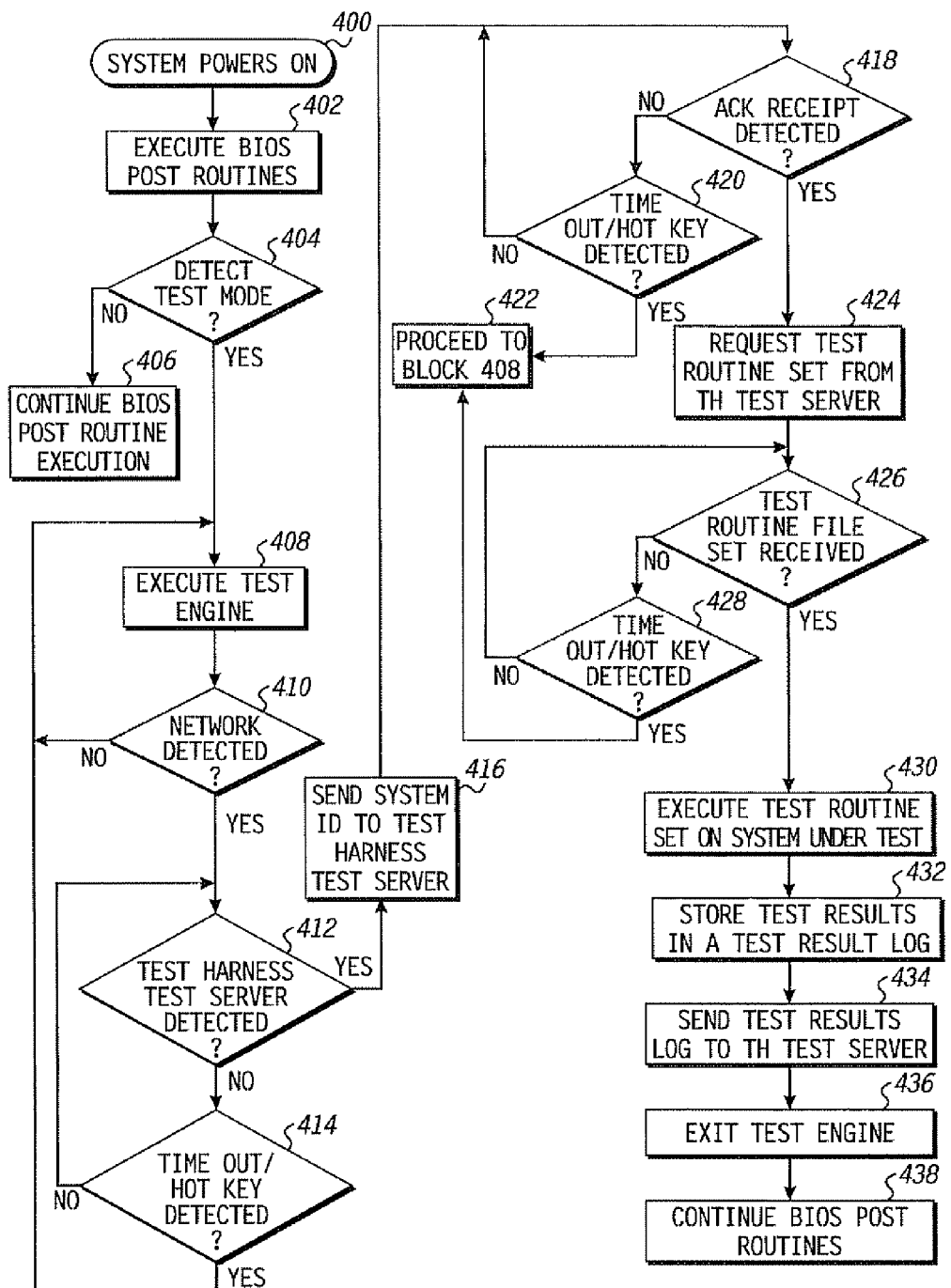
FIG. 4 illustrates a flow diagram describing another method of testing a BIOS using a BIOS test system according to another aspect of the disclosure.

FIG. 4 illustrates a flow diagram describing another method of testing a BIOS using a BIOS test system according to another aspect of the disclosure. FIG. 4 can be employed in whole, or in part, by the information handling system 100 depicted in FIG. 1, the BIOS test system 200 of FIG. 2, or any other type of system, controller, device, module, processor, or any combination thereof, operable to employ all, or portions of, the method of FIG. 4. Additionally, the method can be embodied in various types of encoded logic including software, firmware, hardware, or other forms of digital storage mediums, computer readable mediums, or logic, or any combination thereof, operable to provide all, or portions, of the method of FIG. 4.

The method begins generally at block 400 as a system powers on. At block 402, a BIOS POST routine executes, and at decision block 404, the method detects whether a test mode should be executed. For example, a CMOS bit or test bit in the BIOS can be set to indicate a test mode has been enabled. If a test mode should not be executed, the method can proceed to block 406 and continues the BIOS POST routine execution. If at decision block 404, a test mode should be entered, the method can proceed to block 408, and executes a test engine. The method can then proceed to decision block 410 and detects whether a network connection is available. If a network connection is not available, them method can return to block 408. If a network connection can be detected, the method can proceed to block 412 and detects whether a test harness (TH) test server may be available. If a TH test server is not available, the method can proceed to decision block 414. At decision block 414, if a time out value has been exceeded, or a hot key may be detected, the method can proceed to block 408. If a time out value has not been exceeded or a hot key is not detected, the method can proceed to decision block 412 and repeats.

If at decision block 412, the TH test server is detected, the method can proceed to block 416 and sends a system ID to the TH test server. The method can proceed to decision block 418 to detect whether an acknowledgement has been received. If at decision block 418, an acknowledgement has not been received, the method can proceed to decision block 420 and detects whether a time out value has been exceeded, or a hot key may be detected. If a time out value has not been exceeded or a hot key is not detected, the method can proceed to decision block 418 and repeats. If a time out value has been exceeded or a hot key is detected, the method can proceed to decision block 408.

If at decision block 418, and acknowledgement is detected, the method can proceed to block 424 and requests a test routine file set from the TH test server. For example, an acknowledgement can be received from the TH test server which includes a unique ID of the system under test. The method can then proceed to decision block 426 and detects whether a test routine file set has been received. If the test routine file set has not been received, the method can proceed to decision block 428 and detects whether a time out value has been exceeded, or a hot key may be detected. If a time out value has not been exceeded or a hot key is not detected, the method can proceed to decision block 426 and repeats. If a time out value has been exceeded or a hot key is detected, the method can proceed to decision block 408.

If at decision block 426 a test routine file set is received, the method can proceed to block 430 and executes the test routine set to test the system under test. For example, multiple test routines provided with the test routine file set can be executed. The method can then proceed to block 432 and stores the test results in a test result log. For example, pass/fail status information, test results details, and other types of test result information as needed or desired can be stored in the test result log. The method can then proceed to block 434 and the test results log can be sent to the TH test server. The method can then proceed to block 436 and exits the test engine, and to block 438 and continues the BIOS POST routine execution if desired.

Figure 5:
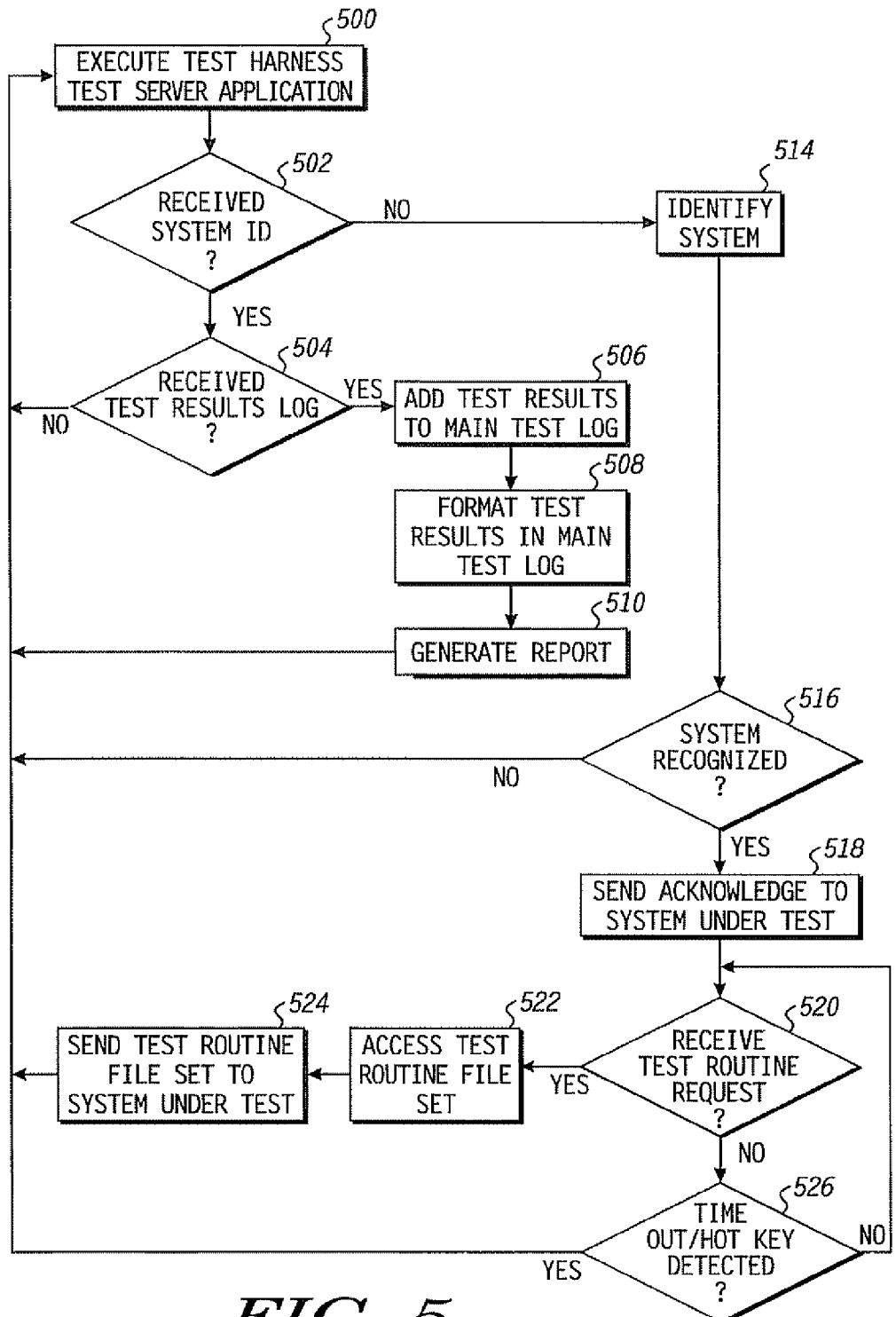
FIG. 5 illustrates a flow diagram describing a method of serving and managing test routines and test results according to another aspect of the disclosure.

FIG. 5 illustrates a flow diagram describing a method of serving and managing test routines and test results according to another aspect of the disclosure. FIG. 5 can be employed in whole, or in part, by the information handling system 100 depicted in FIG. 1, the BIOS test system 200 of FIG. 2, or any other type of system, controller, device, module, processor, or any combination thereof, operable to employ all, or portions of, the method of FIG. 5. Additionally, the method can be embodied in various types of encoded logic including software, firmware, hardware, or other forms of digital storage mediums, computer readable mediums, or logic, or any combination thereof, operable to provide all, or portions, of the method of FIG. 5.

The method begins generally at block 500 as the test harness (TH) test server application executes. For example, a test application can include a TH test server executive that executes on a server. The method proceed to decision block 502 and detects whether a system ID of a system that to be tested has been received. Multiple systems can be tested in parallel and as such, the TH test server can detect more than one system ID as desired. If at decision block 502, a system ID has not been received, the method can proceed to decision block 504 and detects wither a test results log has been received. If a test results log has not been received, the method can proceed to block 500 and repeats. If a test results log has been received, the method can proceed to block 506 and adds the test results to the main test log. For example, the test results can be added to the main test log using a unique ID of the tested system. The method can then proceed to block 508 and the test results can be formatted, and to block 510 and a test report can be generated. The method can then proceed to block 512, and to block 500 and repeats.

If at decision block 502, a system ID has been received, the method can proceed to block 514 and the system can be identified using the system ID. For example, the system ID can be used to generate a unique ID of the system under test. The method can then proceed to decision block 516 and detects whether the system is recognized. For example, a list of system available to be tested can be stored within a systems file, and associated test routines and test files for a specific type of system can be listed. As such, if the system is not recognized, the method can proceed to block 500. If at decision block 516 the system can be recognized, the method can proceed to block 518 and sends an acknowledgement to the system under test using the system unique ID or other unique identifier to the system under test. The method can then proceed to decision block 520 and detects whether a test routine request has been detected. For example, the method can detect a request from the system under test prior to sending a test routine to the system under test. If a test routine request is not detected, the method can proceed to decision block 526 to detect whether a time out value has been exceeded, or a hot key has been selected. If a time out value has been exceeded or a hot key has been selected, the method can proceed to 512 and to block 500 and repeats. If a time out value has not been exceeded or a hot key has not been selected, the method can proceed to block 520 and repeats.

If at decision block 520, a test routine request has been received, the method can proceed to block 522 and accesses and identifies the test routine file set to be sent to the system under test. The method can then proceed to block 524 and the test routine file set can be sent to the system under test. The method can then proceed to block 500 and repeats.

Note that not all of the activities described above in the general description or the examples are required, that a portion of a specific activity may not be required, and that one or more further activities may be performed in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A basic input output system (BIOS) test system comprising:
   a BIOS test manager coupled to a network and configured to enable BIOS testing of multiple information handling systems; and
   an information handling system coupled to the network and including a BIOS comprising:
      a test harness;
      a local test harness driver;
      a test buffer; and
      a test engine;
   wherein:
      the local test harness driver is coupled to the remote BIOS test manager via the network, and is operable to:
         receive a BIOS test routine, the BIOS test routine being operable to test the BIOS;
         store the BIOS test routine in the test buffer; and
         provide a test result to the remote BIOS test manager;
      the test buffer is operable to:
         store the BIOS test routine;
         provide the BIOS test routine to the test engine; and
         store the test result; and
      the test harness is operable to:
         direct the test engine to execute the BIOS test routine to obtain the test result; and
         provide the test result to the local test harness driver.

2. The BIOS test system of claim 1, further comprising a BIOS test source configured to store a plurality of BIOS test routines.

3. The BIOS test system of claim 1, further comprising a version control module configured to manage an updates of the BIOS test routines.

4. The BIOS test system of claim 1, wherein the BIOS further comprises a BIOS test enable bit configured to enable BIOS testing of the BIOS using the test harness, the local test harness driver, the test buffer, and test engine.

5. The BIOS test system of claim 1, wherein the test routine comprises a BIOS call.

6. The BIOS test system of claim 5, wherein:
   the test routine further comprises:
      a test procedure to be performed as a substitute to a preexisting BIOS procedure; and
      a substitution to a BIOS map file such that the BIOS map file is modified to point to the test procedure instead of the preexisting BIOS procedure; and
   the BIOS call is to the preexisting BIOS procedure to perform the test procedure.

7. The BIOS test system of claim 1, wherein the test harness directs the test engine to execute the test routine in response to a trap.

8. The BIOS test system of claim 7, wherein the trap includes a trap on a memory access to a particular memory location in the information handling system.

9. The BIOS test system of claim 7, wherein the trap includes a trap on an I/O access to a particular I/O port in the information handling system.

10. The BIOS test system of claim 1, wherein:
    the test routine includes an access to a debug register of the information handling system; and
    the test result includes information from the debug register.

11. The BIOS test system of claim 1, wherein the test routine operates to simulate a hardware input to the information handling system.

12. A method of testing a basic input output system (BIOS) comprising:
    detecting a test routine using a local test harness driver associated with a first BIOS of a first information handling system, wherein the test routine is communicated over a network from a BIOS test manager employing a remote test harness driver and is operable to test the first BIOS;
    transferring the test routine to a test buffer associated with the first BIOS;
    directing a test engine associated with the first BIOS to execute the test routine to test the BIOS;

determining a test result in response to executing the test routine; and providing the test result to the BIOS test manager.

13. The method of claim 12, further comprising:

determining a first plurality of test routines to test the first BIOS of the first information handling system at a first network location;

determining a second plurality of test routines to test a second BIOS of a second information handling system at a second network location, wherein the first plurality is different from the second plurality;

communicating the first plurality of test routines to the first network location; and communicating the second plurality of test routines to the second network location.

14. The method of claim 12, further comprising:

accessing a BIOS test enable test bit located within a memory of the first BIOS of the first information handling system;

detecting whether the BIOS test enable test bit is set; and enabling a BIOS test harness of the first BIOS to enable testing of the BIOS.

15. The method of claim 12, wherein the test routine comprises:

a test procedure to be performed as a substitute to a preexisting BIOS procedure;

a substitution to a BIOS map file such that the BIOS map file is modified to point to the test procedure instead of the preexisting BIOS procedure; and a BIOS call to the preexisting BIOS procedure to perform the test procedure.

16. The method of claim 12, wherein:

the method further comprises trapping an access to a particular memory location in the first information handling system; and directing the test engine to execute the test routine is in response to trapping the access to the particular memory location.

17. The method of claim 12, wherein the test routine operates to simulate a hardware input to the first information handling system.

18. An information handling system comprising:

a BIOS configured to be tested using a test routine communicated by a remote BIOS test manager;

a BIOS test harness configured to execute a test engine using the BIOS to test the BIOS; and a map file accessible to the BIOS test harness during testing of the test routine communicated by the remote BIOS test manager.

19. The information handling system of claim 18, further comprising:

a test buffer configured to store the test routine;

wherein the test harness is further configured to substitute a first subroutine to test a first portion of the BIOS and first hardware device during execution of the test routine; and wherein the test harness is further configured to substitute a second subroutine to test a second portion of the BIOS when a second hardware device is not present, wherein the second subroutine simulates the second hardware device.

20. The information handling system of claim 18, further comprising a BIOS test enable test bit configured to be altered to enable or disable the BIOS test harness.

* * * * *